H. J. & W. E. POLLACEK.
PUMP.
APPLICATION FILED JAN. 12, 1912.
1,056,709.
Patented Mar. 18, 1913.
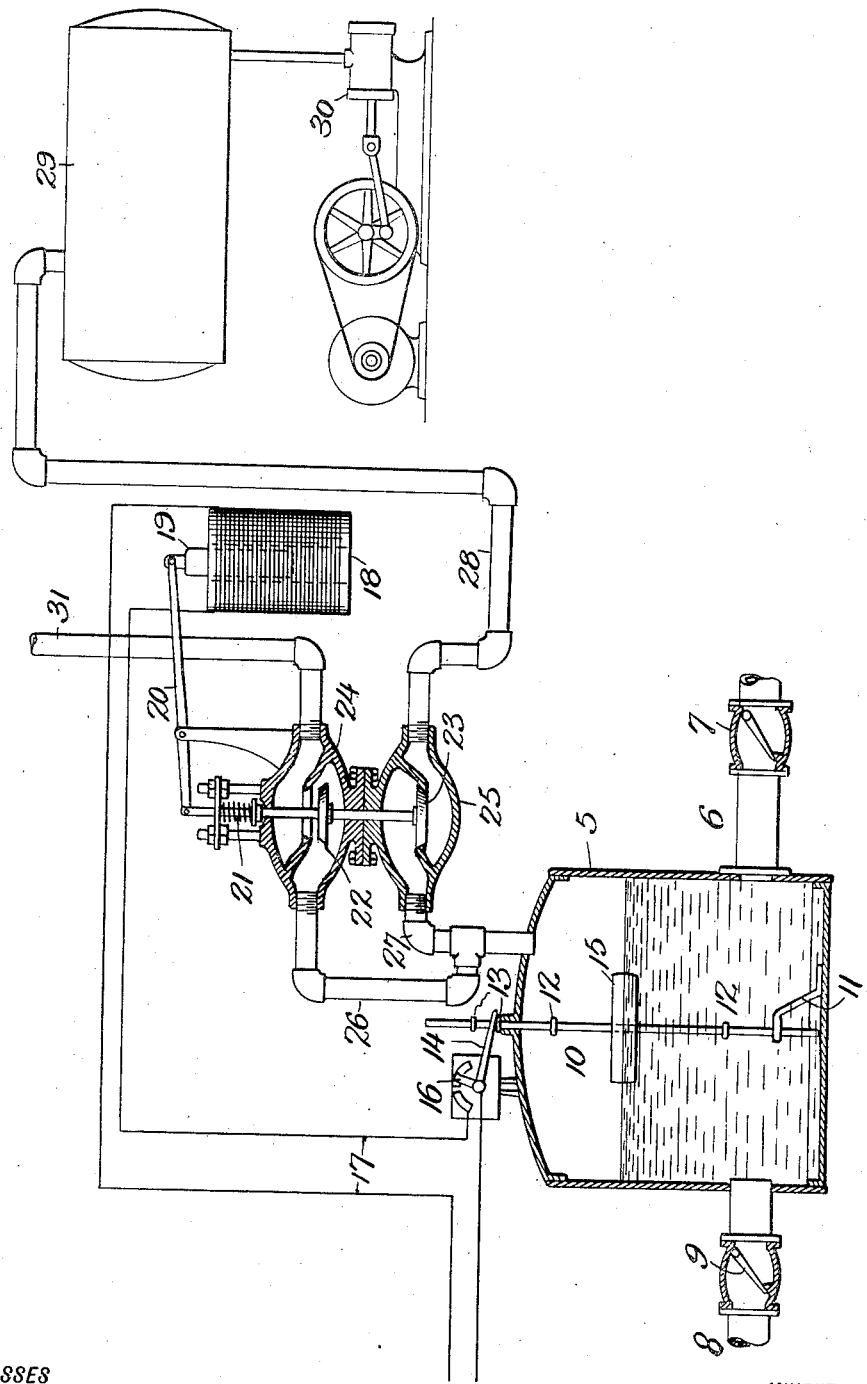
WITNESSES
INVENTORS
Henry J. Pollacek.
William E. Pollacek.
BY
Victor J. Evans
ATTORNEY

UNITED STATES PATENT OFFICE.

HENRY J. POLLACEK AND WILLIAM E. POLLACEK, OF NEW YORK, N. Y.

PUMP.

1,056,709.

Specification of Letters Patent. Patented Mar. 18, 1913.

Application filed January 12, 1912. Serial No. 670,844.

*To all whom it may concern:*

Be it known that we, HENRY J. POLLACEK and WILLIAM E. POLLACEK, citizens of the United States, residing at New York, in the county of New York and State of New York, have invented new and useful Improvements in Pumps, of which the following is a specification.

This invention relates to sewage flush systems and more especially to air valves used in connection with same and the object of the invention is to provide valves adapted to either provide a retaining tank with sufficient air pressure to flush and empty same or to permit of the escape of the air when the sewage is accumulating in the tank, the operation of the valve being automatic and controlled by electrical means, as will be hereinafter more fully explained in the following specification, set forth in the claim and illustrated in the drawing, wherein a partly sectional view of a sewage plant is shown provided with the improved valves and the electrical connections.

In the drawing, the tank 5 is provided to accumulate the sewage entering same through pipe 6, from any desired source and having the check valve 7 to prevent the return of the sewage when it once passes. An outlet pipe 8 is also provided with a valve 9, which may be below the ordinary sewerage system of a city, so that the check valve 9 prevents the return of any of the sewage after it has been forced outward.

Within the tank 5 is a vertical moving rod 10 journaled in the top of the tank and guided at its lower end by a bracket 11. This rod is also provided with stops or collars 12 within the tank and similar collars 13 on the outside of the tank between which is located the fork of a lever 14. The rod also carries a float 15, adapted to rise and fall with the sewage in the tank and make contact with one or the other of the stops 12 so as to move the rod 10 up or down. The float 15 is shown at an intermediate point between the two stops but as the sewage rises, the float eventually strikes the upper stop and elevates the rod 10 so that the stops 13 turn the lever 14 on its pivot and throws a switch 16 so as to complete an electric circuit 17 and energize the solenoid 18 drawing the core 19 downward and tilting the lever 20 which carries the valve stem 21 at its outer end.

The valves 22 and 23 are carried within casings 24 and 25 having the usual seats for the valves and both connected with the tank 5 by means of pipes 26 and 27. The valve casing 25 is also connected by means of a pipe 28 with a compressed air tank 29 receiving its air from a compressor 30 or any other desired source and the casing 24 is provided with a pipe 31 which exhausts the air from the tank 25.

The drawings show the sewage accumulating in the tank 5 and as soon as the float strikes the upper stop 12, the switch 16 will be thrown so as to complete the circuit 17, the lever 20 will be drawn down, elevating the valves 22 and 23, closing the former and opening the latter. The escape of air is therefore prevented by the closing of the valve 22, while the compressed air instantly rushes through the casing 25 and into the tank 5, forcing the sewage out through the valve 9 and outlet 8 to any desired point. As the sewage is expelled, the float 15 descends until it strikes the stop 12 at a point just above the outlet and inlet pipes so that no air is allowed to escape and the downward movement of the rod 10 causes the switch 16 to break the circuit 17, releasing the core 19, the spring closing valve 23 and opening the valve 22, which permits the air to leave the tank and the sewage to again accumulate.

This automatic device is very useful for the accumulation of sewage to be expelled at a much higher point than is possible from a natural flow and is especially useful in buildings having sub-cellars or where sewage accumulates at a very low point which is often the case in systems and where municipal sewers are but a few feet below the surface. This device may also be found useful in the automatic handling of other liquids where it is necessary to carry them to high points about a plant as they accumulate in tanks.

It is obvious that the parts may be otherwise arranged and modified without departing from the essential features above described.

What we claim as new and desire to secure by Letters Patent is,—

A sewage-level control system comprising a sewage tank having valve controlled intake and discharge pipes, a compressed air reservoir, a valve casing having two communicating chambers, one of which is connected with said sewage tank and the other of which is connected with said compressed air reservoir, a second valve casing having two communicating chambers one of which is connected with said sewage tank and the other of which is open to the outer air, valves arranged in said valve casings and controlling the communication between the chambers therein, a valve stem common to and carrying said valves, said valves being so arranged that when the opening between the chambers in one casing is closed, the chambers in the other casing are in communication, a solenoid provided with a plunger, a lever connecting said plunger and valve stem, a float resting on the surface of the sewage in said sewage tank, and means operated by said float for controlling the current through said solenoid and thereby alternately connecting said sewage tank with said compressed air reservoir and the outer air.

In testimony whereof we affix our signatures in presence of two witnesses.

HENRY J. POLLACEK.
WILLIAM E. POLLACEK.

Witnesses:
JAMES F. DUHAMEL,
THEO. H. FRIEND.